United States Patent [19]

Gotoh

[11] Patent Number: 4,977,552
[45] Date of Patent: Dec. 11, 1990

[54] SPLIT TYPE OPTICAL PICK-UP DEVICE WITH A TRACKING ERROR DETECTOR ON THE MOVING PART

[75] Inventor: Hiroshi Gotoh, Kawasaki, Japan

[73] Assignee: Ricoh Company, Ltd., Tokyo, Japan

[21] Appl. No.: 232,319

[22] Filed: Aug. 15, 1988

[30] Foreign Application Priority Data

Aug. 17, 1987 [JP] Japan .................................. 62-203832

[51] Int. Cl.$^5$ ................................................ G11B 7/00
[52] U.S. Cl. ................................................... 369/44.14
[58] Field of Search .................................... 369/43–47, 369/32, 112, 110, 44.14; 250/201; 358/342

[56] References Cited

U.S. PATENT DOCUMENTS

| 4,322,838 | 3/1982 | Neumann | 369/112 X |
| 4,644,516 | 2/1987 | Musha | 369/43 |
| 4,688,201 | 8/1987 | Towner et al. | 369/44 |
| 4,822,139 | 4/1989 | Yoshizuma | 369/45 X |

Primary Examiner—Robert L. Richardson
Attorney, Agent, or Firm—Cooper & Dunham

[57] ABSTRACT

A split type optical pick-up device suitable for use in an optical disc memory system has a two-part structure: stationary and movable optical systems which are provided separately. The stationary optical system includes a semiconductor laser for emitting a laser beam which is received by a deflecting member of the movable optical system. The thus deflected laser beam is focused onto an optical disc by an objective lens. The light reflected from the optical disc passes through the objective lens in the reverse direction and also through the deflecting member to impinge upon a tracking error detector which is also provided in the movable optical system. The deflecting member has differnt rates of transmission for p and s polarized light for the light reflected from the optical disc such that the s polarized light is reflected toward the stationary optical system as much as possible so as not to waste the s polarized light, which defines a component of an information signal to be reproduced in the stationary optical system. Because of the provision of the tracking error detector in the movable optical system, there will be produced no offset in a tracking signal generated by the tracking error detector, and since the deflecting member reflects the s polarized light as much as possible, there is obtained an enhanced S/N ratio.

20 Claims, 4 Drawing Sheets

Fig. 5 Prior Art
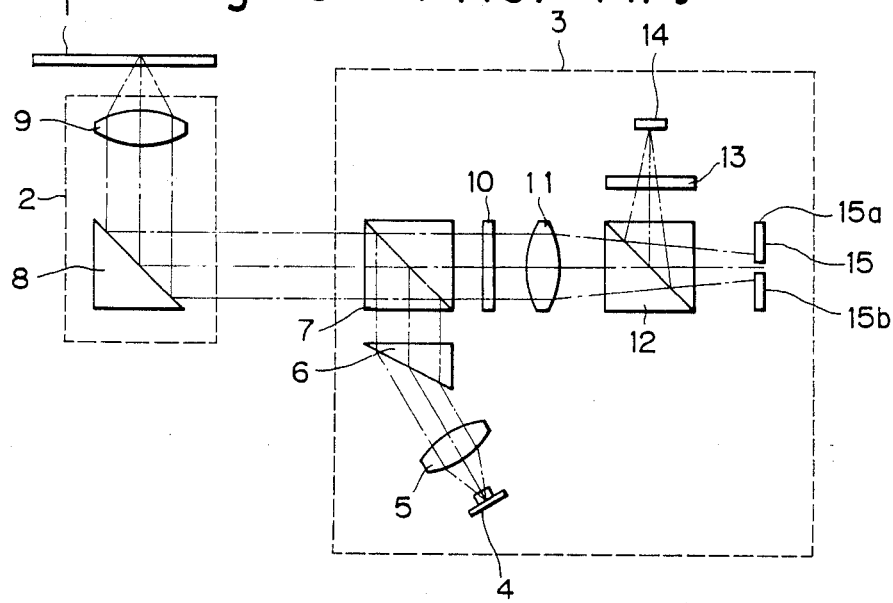
Fig.6a    Fig.6b
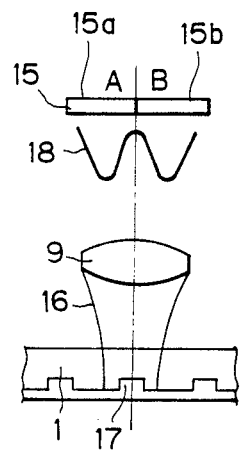 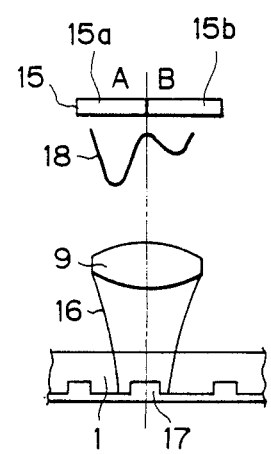

SPLIT TYPE OPTICAL PICK-UP DEVICE WITH A TRACKING ERROR DETECTOR ON THE MOVING PART

BACKGROUND OF THE INVENTION

1. Field of the Invention

This invention generally relates to an optical pick-up device for use in an optical disc system or the like, and, in particular, to a split type optical pick-up device for eraseably writing and reading information to and from an optical disc, which includes a stationary optical system and a movable optical system.

2. Description of the Prior Art

An optical pick-up device of an optical disc memory system is well known, and, in general, such a device includes an objective lens through which a laser beam is passed to form a small light spot on an optical information recording medium, such as an optical disc, thereby allowing to record and read or erase information to and from the recording medium. Such an optical disc system has a particularly large information storage capacity and an optical disc is removable.

In such an optical disc memory system, since an information pit, i.e., a unit of information to be recorded on an optical disc, is extremely small, in the order of 1 micron, in order to record and reproduce information to and from an optical disc accurately it is necessary to carry out focusing control, tracking control and seek control. Focusing control is typically carried out by displacing the objective lens along an optical axis thereof, and tracking control is carried out by displacing the objective lens in the tracking direction or in a direction transverse to a recording track of the optical disc. Seek control is typically carried out by moving the overall optical pick-up device first to a location in the vicinity of a target track by a coarse control operation and then to the exact desired location by a fine control operation.

However, as compared with the typical prior art pick-up device for a magnetic disc memory, an optical pick-up device weighs several hundreds grams in its entirety. For this reason, according to a control method in which the entire optical pick-up device is moved in the tracking direction, the inertia of the optical pick-up device becomes an important factor in the seek control operation for bringing a laser spot to a position in the vicinity of a desired track by moving the objective lens. Because of this, a high-speed seek operation is difficult to carry out and thus access time tends to be longer.

In an effort to cope with this problem, a split type or actuator seek type optical pick-up device has been proposed to realize high-speed accessing in an optical disc memory system. FIG. 5 schematically illustrates such a split type optical pick-up device. As shown in FIG. 5, such a split type optical pick-up device includes a movable optical system 2 which is located opposite a recording surface of an optical disc 1 which serves as an optical information recording medium. The movable system 2 executes a seek movement in the radial direction of the disc 1. Optically coupled to the movable optical system 2 is a stationary optical system 3 which is fixedly mounted on a mounting device or carriage.

The stationary optical system 3 includes a semiconductor laser 4. A laser beam emitted from the laser 4 passes through a coupling lens 5, whereby the laser beam is collimated. The laser light emitted from the semiconductor laser 4 has an elliptic light intensity distribution; however, when the laser light emitted from the laser 4 passes through an anamorphic prism 6, the laser light is shaped to have a circular light intensity distribution. Then, the laser beam is incident upon a beam splitter 7 where the laser beam is deflected toward a beam deflecting member 8 disposed within the movable optical system 2, so that the laser beam is deflected toward a bottom surface of the optical disc 1. In this instance, the laser beam passes through an objective lens 9 so that the laser beam is focused onto the bottom surface of the optical disc 1 in the form of a beam spot minute in size.

The optical disc 1 reflects this light impinging thereon, and this reflected light also passes through the objective lens 9 and then is deflected toward the stationary optical system 3 by the deflecting member 8. This returning light beam then passes through the beam splitter 7 and then enters into a light polarization beam splitter 12 after passing through a half wavelength plate 10 and a detector lens 11. The light beam is split into two beams by the light polarization beam splitter 12 and one of the split beams impinges upon a focus detecting light-receiving device 14 after passing through a cylindrical lens 13 while the other split beam impinges upon a track detecting light-receiving device 15. A tracking signal is detected by a well-known far field method and a focusing signal is detected by a known astigmatism method. And, an information signal is detected by a known differential method by taking a difference between these two signals detected by the two light-receiving devices 14 and 15.

In order to carry out a separate actuator driving operation, the light emitted from the stationary optical system 3 is collimated and enters into the movable optical system 2 in a radial direction of the optical disc 1. It is to be noted that although not shown specifically, the movable optical system 2 is also provided with various other elements, such as a driving device for driving the objective lens 9 to effect focusing and/or tracking.

Now, referring to FIGS. 6a and 6b, the principle of operation for detecting a tracking signal will be described. FIG. 6a illustrates the condition in which a laser light spot 16 condensed by the objective lens 9 is located at the center of a track 17 of the optical disc 1. In this case, since the light spot 16 is located at the center of the track 17, the laser beam is diffracted symmetrically with the track as a center of symmetry. As a result, a pair of light-receiving elements, photoelectric elements, 15a and 15b of the two-division type light-receiving device 15 for detecting a tracking signal, which is disposed inside the stationary optical system 3 receives diffracted light having a symmetrical light distribution pattern 18 as shown in FIG. 6a. As a result, outputs A and B from these light-receiving elements 15a and 15b, respectively, are equal in magnitude, i.e., A=B, which indicates the fact that the optical pick-up device is in a proper tracking position. If the location of the light spot 16 is shifted sideways from the central position of the track 17 as shown in FIG. 6b, the distribution pattern 18 of diffracted light becomes asymmetrical between right and left, so that there is produced a difference in magnitude between outputs A and B of the respective light-receiving elements 15a and 15b. A tracking signal is detected by taking an output difference A−B between the light-receiving elements 15a and 15b and a tracking control operation is carried out to reduce this difference between outputs A and B to zero.

In such a tracking control operation, in the case of a split type optical pick-up device, only the movable optical system 2, having a relatively small mass, is moved with respect to the optical disc 1, so that the energy for moving an object to effect tracking control could remain relatively low tracking could be carried out at high speed, e.g., access time within 100 msec. However, such a split type optical pick-up device is not free of drawbacks. In the first place, due to a deviation from the parallel condition between the carriage for movable system 2 and the collimated light projected from the stationary optical system 3, there could be an offset in the tracking signal. In addition, the movable optical system 2 may shift in position in the vertical direction during access operations due to a play in the carriage, deposition of debris and change in temperature, which could also cause an offset in the tracking signal.

When such an offset is produced in the tracking signal, the spot 16 is not located at the center, which could cause the tracking operation to be unstable. In addition, the information recording, reproducing and erasing characteristics could deteriorate. In particular, referring to FIGS. 7 and 8, when the deflecting member 8 is located at its initial position indicated by the solid line in FIG. 7, there is obtained a distribution pattern 18 of diffracted light on the tracking detecting light-receiving device 15 as indicated also by the solid line. Under these conditions, a detection signal obtained from the light-receiving device 15 can be set to zero offset by initial adjustment as shown in FIG. 8a. However, when the deflecting member 8 has been displaced over a distance d upwardly in the vertical direction as indicated by the phantom line in FIG. 7 due to movement of the movable optical system 2 for focusing control, the light path for the laser beam reflected from the optical disc 1 and advancing to the light-receiving device 15 within the stationary optical system 3 through the objective lens 9 and deflecting member 8 is also shifted in position upwardly over the corresponding distance d. As a result, the diffracted light distribution pattern 18 on the light-receiving device 15 is also shifted in position as indicated by the phantom line. Accordingly, there is produced an offset in a detection signal obtained from the light-receiving device 15 as compared with the initial condition as shown in FIG. 8b. With such a tracking detection signal having an offset, the laser light spot 16 will be located at a position away from the central position of the track 17 when a tracking control operation has been carried out, thereby producing an error having an amount delta as shown in FIG. 8b. Therefore, under such a condition, it may not be possible to carry out highly accurate recording and reproducing operation.

In order to prevent such an offset from occurring, it is necessary to eliminate plays in the assembly as much as possible by adopting a high assembling accuracy; however, such an approach pushes up the cost of manufacture. In another invention by the present inventor, a split optical pick-up unit has a movable optical system which contains a beam splitter serving as a light deflecting member. A tracking detecting device receives the light which has been reflected from the optical disc and has passed through the beam splitter to thereby detect a tracking signal without producing an offset. This related invention is disclosed in U.S. patent application Ser. No. 07/150,134 filed on Jan. 29, 1988, is entitled "A SPLIT TYPE OPTICAL PICK-UP DEVICE", and is assigned to the assignee of this application, and is incorporated in its entirety herein by reference. In this related invention, an information signal is detected by leading the light reflected by the beam splitter into the stationary optical system. In this case, however, the light reflected from the optical disc is split by the beam splitter into a transmitted light beam and a reflected light beam, for example, at a ratio of 1:9. As a result, a portion of the information signal is supplied to the tracking detecting light-receiving device, which does not use it, only to be wasted and thus the information signal to be supplied to an information signal detecting light-receiving device disposed within the stationary optical system is reduced by the corresponding amount. This affects the S/N ratio of information signal.

SUMMARY OF THE INVENTION

In accordance with the present invention, there is provided a split type optical pick-up device which includes first and second optical systems which are separate from each other and which may move relative to each other. The present optical pick-up device is suitable for use in an optical disc memory system and in such a system the present optical pick-up device is disposed in association with an optical disc serving as an optical information recording medium. The first optical system includes a light source for emitting a light beam in a predetermined direction. The light source is preferably comprised of a semiconductor laser. And, the first optical system is preferably fixed in position within the optical pick-up device. The first optical system preferably also includes a focusing detector. The second optical system includes an objective lens located opposite an optical information recording medium, such as an eraseable optical disc, and deflecting means for deflecting the light beam emitted from the first optical system toward the objective lens, thereby causing the deflected light beam to impinge upon the associated optical information recording medium. The second optical system also includes a tracking detector which is disposed to receive light reflected from the optical information recording medium through the deflecting means. The second optical system is preferably movable in the present optical pick-up device, so that there may be relative movement between the first and second optical systems. With the tracking detector provided in the second movable optical system, no offset will be produced in a tracking signal.

In the preferred embodiment of this invention, the deflecting means provided in the second optical system has differing light transmission rates between p and s polarized light. In one embodiment of this invention, the deflecting means of the second optical system does not transmit the s polarized light substantially and instead causes the s polarized light to be reflected. Since the s polarized light is the relevant information signal, such a structure enhances the S/N ratio.

It is therefore a primary object of the present invention to obviate the disadvantages of the prior art as described above and to provide an improved optical pick-up device suitable for use in an optical information recording and reproducing system.

Another object of the present invention is to provide an improved optical pick-up device having split first and second optical systems which may move relative to each other.

A further object of the present invention is to provide an improved split type optical pick-up device which is prevented from producing an offset in a tracking signal.

A still further object of the present invention is to provide an improved optical pick-up device high in access speed, accurate and reliable in operation, and simple in structure.

A still further object of the present invention is to provide an improved split type optical pick-up device having an enhanced S/N ratio in producing an information signal.

Other objects, advantages and novel features of the present invention will become apparent from the following detailed description of the invention when considered in conjunction with the accompanying drawings.

BRIEF DESCRIPTION OF THE DRAWINGS

FIG. 5 is a schematic illustration showing the basic structure of a prior split type optical pick-up device which has been developed by the same inventor prior to the present invention;

FIGS. 6a and 6b are illustrations which are useful for explaining the principle of detecting a tracking signal.

DESCRIPTION OF THE PREFERRED EMBODIMENTS

Figure 1:
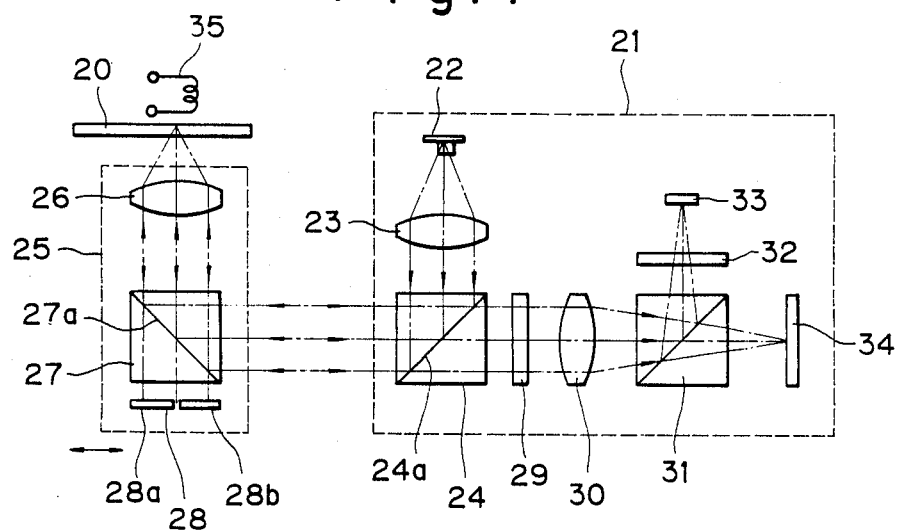
FIG. 1 is a schematic illustration showing the overall structure of a split type optical pick-up device constructed in accordance with one embodiment of the present invention.

Referring now to FIG. 1, there is schematically shown a split type optical pick-up device constructed in accordance with one embodiment of the present invention. The optical pick-up device of FIG. 1 is illustrated as applied to an optical disc memory system, and, thus, the present optical pick-up device is disposed in association with an optical disc 20 serving as an optical information recording medium. As shown in FIG. 1, the present optical pick-up device includes a first, stationary optical system 21 which is fixed in position. In the illustrated embodiment, the stationary optical system 21 includes a semiconductor laser 22 for emitting a laser beam in a predetermined direction, a coupling lens 23 for receiving the laser beam emitted from the laser 12 and collimating the laser beam, and a beam splitter 24 provided with a reflecting film 24a for reflecting the thus collimated laser beam in a predetermined direction which is parallel to the recording surface of the optical disc 20.

The present optical pick-up device also includes a second, movable optical system 25 which is spaced apart from the stationary optical system 21 in the radial direction of the optical disc 20 and is below the recording surface of the optical disc 20. In the illustrated embodiment, the movable optical system 25 is movable in a tracking direction of the optical disc 20. The movable optical system 25 includes an objective lens 26 which is located opposite the recording surface of the optical disc 20 and causes a laser beam to be condensed onto the recording surface of the optical disc 20 in the form of a minute laser beam spot. The movable optical system 25 also includes a beam splitter 27 which serves as a deflecting member for deflecting the laser beam coming from the stationary optical system 21 toward the objective lens 26. In the illustrated embodiment, the beam splitter 27 is provided with a reflecting film 27a at an angle of 45° so as to reflect a major portion of the laser beam coming from the stationary optical system 21 and to allow to pass therethrough the remaining portion of the laser beam coming from the stationary optical system 21. Beam splitter 27 can be made by cementing together two triangularly shaped parisms, with the film 27a at the interface thereof.

Of importance, in the illustrated embodiment, the movable optical system 15 also includes a two-division light-receiving device 28 which includes a pair of light-receiving elements (photoelectric elements) and serves as a tracking error detector. With this structure, the light reflected from the optical disc 20 first passes through the objective lens 26 and then passes through the reflecting film 27a of the beam splitter 27 to impinge upon the light-receiving element 28 which serves as a tracking detector. Thus, the light-receiving device 28 is disposed to receive the light reflected from the optical disc 20. In the illustrated embodiment, the device 28 includes a pair of light-receiving elements 28a and 28b which are disposed with the center position between the elements 28a and 28b being in agreement with the optical axis of the objective lens 26. As will be made clear later, a tracking control operation can be carried out by comparing the magnitudes of two outputs obtained from these light-receiving elements 28a and 28bA portion of the light reflected from the optical disc 20, is reflected by the reflecting film 27a of the beam splitter 27 toward the stationary optical system 21, after passing through the objective lens 26. This returning light from the movable optical system 25 to the stationary optical system 21 is separated from the incident light coming from the semiconductor laser 22 by the beam splitter 24 because this returning light is permitted to pass through the reflecting film 24a of the beam splitter 24. As shown in FIG. 1, in the present embodiment, the stationary optical system 21 also includes a half wavelength plate 29 for rotating the plane of polarization over 45°, a detector lens 30, and an analyzer 31, in the order mentioned in a light path for the light passing through the reflecting film 24a. The analyzer 31 divides the incoming light beam into two light beams, one of which propagates through a cylindrical lens 32 and impinges upon a light-receiving device 33 with the other beam impinging upon a light-receiving device 34. These light-receiving devices 33 and 34 define a signal detecting unit.

As shown in FIG. 1, an electromagnet 35 is disposed near the top surface of the optical disc 20 and the electromagnet 35 applies a bias magnetic field to the optical disc 20 when energized during recording or erasing information.

With the above-described structure, a laser beam emitted from the semiconductor laser 22 within the stationary optical system 21 is deflected by the beam splitter 24 of the stationary optical system 21 and then by the beam splitter 27 of the movable optical system 25, and, then, the thus deflected laser beam is condensed onto the recording surface of the optical disc 20 in the form of a minute light spot by means of the objective lens 26. Then, the portion of this light which is reflected from the optical disc 20 passes through the objective lens 26 again, this time in the reverse direction, and, then, it enters into the beam splitter 27. A portion of the light entering into the beam splitter 27 is reflected by the reflecting film 27a, to be returned toward the stationary optical system 21. Thus, a focusing signal may be obtained from the light-receiving device 33 according to the well-known astigmatism method. And, an information signal (opto-magnetic signal) is detected by a differential method by taking a difference between the detection signals obtained by the light-receiving devices 33 and 34. However, the remaining portion of this light reflected from disc 1 passes through the reflecting film 27a and impinges upon the light-receiving device 28 which thus produces a tracking (error) signal in accordance with a far field method.

In the above-described embodiment, since the tracking detecting light-receiving device 28 is provided in the movable optical system 25, with the center of the device 28 in agreement with the optical axis of the objective lens 26, even if the movable optical system 25 shifts position in the vertical direction during the movement of its carriage or even if there is a discrepancy in angle between the axis of movement of the carriage and the optical axis of the collimated light travelling from the stationary optical system 21 to the movable optical system 25, the incident condition of the reflecting light from the optical disc 20 to the tracking detection light-receiving device 28 remains unchanged, and, thus, no offset is produced in a tracking (error) signal. Thus, a tracking control operation can be carried out highly accurately and reliably to bring the light spot to the center of a track. It is to be noted that the addition of the tracking detecting light-receiving device 28 to the movable optical system 25 does not cause a significant increase in weight, so that the high-speed access feature by the movable optical system 25 is not hampered.

Figure 2:
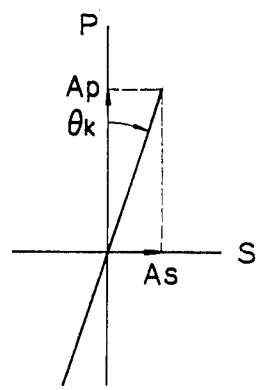
FIG. 2 is an illustration showing the principle of detecting an information signal from an optical disc.

Now, the principle of enhancing the S/N ratio in detecting an information (opto-magnetic) signal from the light reflected from the optical disc 20 in accordance with the present invention will be described in detail. In an optical disc, reproduction of an information signal is carried out by utilizing the rotation of the plane of polarization due to the so-called Kerr effect. For example, when light of linear polarization (p polarized light) is reflected by the optical disc 20, its plane of polarization rotates over the angle $\theta_k$ and thus there is produced not only p polarized light component $A_p$, but also s polarized light component $A_s$ as shown in FIG. 2. This s polarized light component $A_s$ becomes the relevant information signal component.

The beam splitter 27 is required to reflect a portion of the incoming light and to allow a portion of the incoming light to pass therethrough, and in order to transmit the light emitted from the semiconductor laser 22 to the optical disc 20 efficiently, the rate of reflection of the beam splitter 27 should be greater than its rate of light transmission. In the present embodiment, since the relevant information signal component to be detected is s polarized light, the beam splitter 27 is selected such that its rate of transmission of p polarized light differs from its rate of transmission of s polarized light.

In the structure of the above-described embodiment, in order to obtain a stable track signal, the beam splitter 27 transmits 5-30% of the light reflected from the optical disc 20, to thereby cause such transmitted light to impinge upon the tracking signal detecting light-receiving device 28. In this case, the remaining 95-70% of the reflecting light returns to the stationary optical system 21 to be used, for example, for reproducing the relevant information (opto-magnetic) signal. In this case, if use were made of a beam splitter 27 having identical transmission rate for both of p and s polarized light, the s polarized light, which is the relevant information signal, would also pass through the beam splitter 27 to reach the tracking signal detecting light-receiving device 28. The S/N ratio of an information (opto-magnetic) signal would therefore decrease.

In accordance with the present invention, since use is made of a beam splitter 27 having differing rates of transmission for p and s polarized light (e.g., the rate of reflection for s polarized light is approximately at 100% and the rate of transmission for s polarized light is approximately at 0%), almost all of the signal component which defines an information signal in the light reflected from the optical disc 20, can go to the light-receiving devices 33 and 34 of the stationary optical system 21. Accordingly, an information (opto-magnetic) signal can be reproduced at an enhanced S/N ratio. In this case, the light passing through the beam splitter 27 to impinge upon the tracking signal detecting light-receiving device 28 does not contain the s polarized light; however, the amount of this s polarized light is very small, so that the elimination of the s polarized light from the light propagating toward the tracking signal detecting light-receiving device 28 does not cause problems in detecting a tracking signal.

Figure 3:
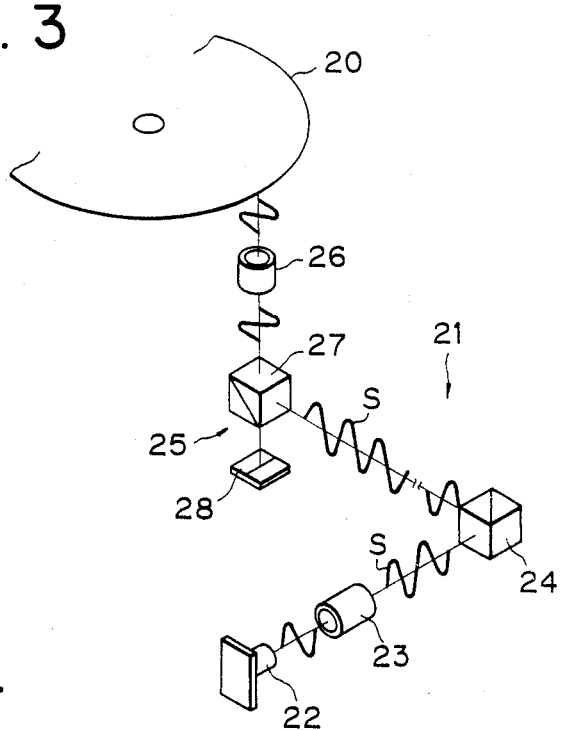
FIG. 3 is a schematic illustration showing in perspective view the split type optical pick-up device of FIG. 1.
Figure 4:
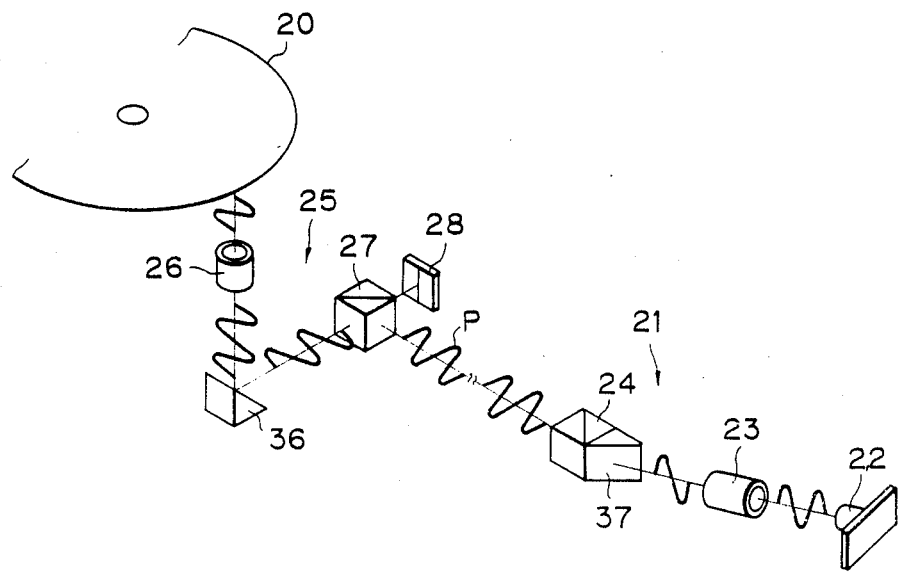
FIG. 4 is a schematic illustration showing in perspective view a split type optical pick-up device constructed in accordance with another embodiment of the present invention.
Figure 7:
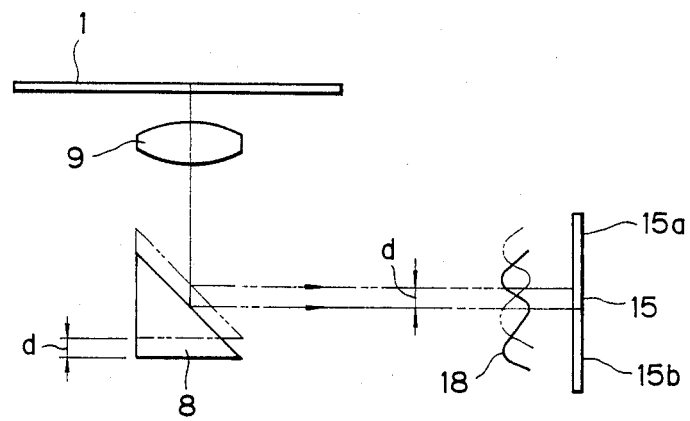
FIGS. 7 and 8a and 8b are illustrations which are useful for understanding how an offset is produced in a tracking signal in the structure shown in FIG. 5.
Figure 8A:
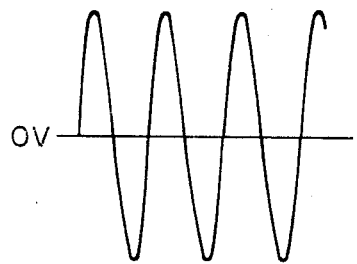
Figure 8B:
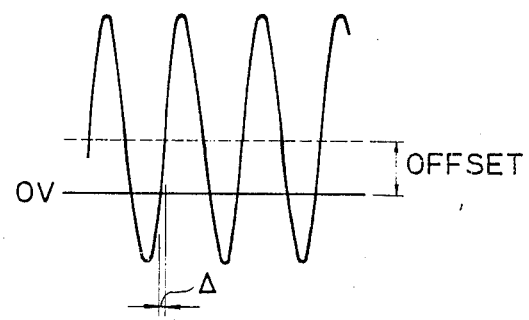

FIG. 4 illustrates a modification of the structure shown in FIG. 3. In this modified structure, the movable optical system 25 includes a prism 36 serving as an additional light deflecting element allowing changes in the arrangement and orientation of other elements, such as beam splitter 27 and light-receiving element 28. This also holds true in the structure of the stationary optical system 21. For example, an anamorhpic prism 37 for shaping a light beam may be disposed between the coupling lens 23 and the beam splitter 24 as shown in FIG. 4. In addition, use may be made of a semiconductor laser which emits p polarized light as the semiconductor laser 22.

In the embodiments described above, the focusing detecting light-receiving device 33 and its associated elements are provided in the stationary optical system 21, and, thus, there is no increase in weight in the movable optical system 25 by these elements. As will be understood, there arises no particular problem even if the focusing (error) detecting system is provided in the stationary optical system 21. That is, a focusing condition detecting operation by the light-receiving device 33 is carried out such that a focusing error is detected by determining whether the light reflecting from the optical disc 20 has changed to convergent light or to a divergent light from the collimated light. And, thus, no offset is produced in the focusing (error) signal even if there is a shift in position of the movable optical system 25 in the vertical direction or even if there is an inclination in the optical axis.

As described above, in accordance with the present invention, since the tracking error detector is provided in the movable optical system of a split type optical pick-up device, even if there is a fluctuation in the position of the movable optical system, the positional relationship between the optical axis of the objective lens and the tracking error detector can be maintained unchanged at all times, so that no offset is produced in a tracking (error) signal and an accurate tracking control operation can always be carried out. In addition, the basic feature of high-speed access by the movable optical system is well preserved, and, thus, the present optical pick-up can be moved at high speed without being adversely affected by the inertia effect of the movable optical system. Since the light deflecting member provided in the movable optical system has differing rates of transmission for p and s polarized light, the s polarized light need not be led to a tracking signal detecting light-receiving device and can be efficiently led to an information signal detecting unit. Accordingly, an information signal can be reproduced at an enhanced S/N ratio.

While the above provides a full and complete disclosure of the preferred embodiments of the present invention, various modifications, alternate constructions and equivalents may be employed without department from the true spirit and scope of the invention. Therefore the above description and illustration should not be construed as limiting the scope of the invention, which is defined by the appended claims.

What is claimed is:

1. An optical pick-up device comprising:
 a first optical system including alight source for emitting light;
 a second optical system including tracking error detecting means, deflecting means for deflecting said light from said first optical system in a predetermined direction, focusing means for focusing the thus deflected light onto an optical information recording medium which reflects said focused light in the form of reflected light having p and s polarized light, said deflecting means deflecting a portion of said light reflected from said optical information recording medium toward said first optical system and permitting the remaining portion of said light reflected from said optical information recording medium to pass therethrough and to impinge on said tracking error detecting means, said deflecting means having different rates of transmission for p and s polarized light in said light reflected from said optical information recording medium; and
 wherein said first and second optical systems are movable relative to each other.

2. The device of claim 1, wherein said first optical system is fixed in position in said device and said second optical system is movable relative to said first optical system.

3. The device of claim 2, wherein said recording medium has a recording track and said second optical system is movable in a direction transverse to said recording track provided in the optical information recording medium.

4. The device of claim 2, wherein said optical information recording medium is an optical disc which is supported to be rotatable and said second optical system is movable with respect to said first optical system in a radial direction of said optical disc.

5. The device of claim 1, wherein said deflecting means comprises a beam splitter formed by a pair of triangularly shaped prisms cemented together with a reflecting film interposed at an interface between the two prisms.

6. The device of claim 1, wherein said deflecting means has a rate of light reflection which is greater than a rate of light transmission thereof.

7. The device of claim 6, wherein said deflecting means transmits 5–30% of said light reflected from said optical information recording medium toward said tracking error detecting means while reflecting the remaining portion of said light reflected from said optical information recording medium toward said second optical system.

8. The device of claim 1, wherein said deflecting means relfects approximately 100% of s polarized light and transmits approximately 0% s polarized light in said light reflected from said optical information recording medium.

9. The device of claim 1, wherein said light source is a semiconductor laser.

10. The device of claim 1 in which said light source emits p polarized light.

11. A device for use with an optical information recording medium which has one or more tracks positionally related to information storage locations at the medium comprising:
 a first optical system which includes a light source emitting a light beam;
 a second optical system which receives said light beam from the first optical system and causes at least a portion thereof to impinge on said medium and to be reflected thereby as a reflected beam to thereby read information from or write information in or on the medium;
 wherein said second optical system is movable relative to the first optical system in the course of said reading or writing of information; and
 wherein said second , movable optical system includes a tracking error detector which is movable therewith relative to the first optical system and receives at least a portion of said reflected beam and in response thereto generates a signal related to tracking errors related to said reading or writing of information.

12. A device as in claim 11 in which said first optical system is stationary relative to said device.

13. A device as in claim 12 in which said second optical system is movable in an accessing direction which is locally transverse to said one or more tracks.

14. A device as in claim 13 in which said medium is a rotatable optical disc and said accessing direction is along a radius of said disc.

15. A device as in claim 14 in which said second optical system includes a beam splitter which receives said beam from the first optical system and directs at least a portion thereof to said medium and receives said reflected beam and directs a first portion thereof to said tracking error detector and a second portion thereof to said tracking error detector and a second portion back to said first, stationary optical system, said beam splitter comprising a pair of prisms and a partially reflecting film therebetween, said prisms and film being cemeted together to form an integral structure serving as said beam splitter.

16. A device as in claim 15 in which said film reflects toward said first, stationary optical system more than half of the reflected beam received thereby from said medium.

17. A device as in claim 16 in which said film reflects toward said first, stationary optical system about 70-95% of the reflected beam received thereby from said medium.

18. A device as in claim 11 in which said reflected beam includes p polarized and s polarized light and said second, movable optical system includes a partially reflecting element which receives said reflected beam and reflects toward said first, stationary optical system substantially all of the s polarized light and more than half of the p polarized light received thereby and transmits to said tracking error detector less than half of the p polarized light received thereby.

19. A device as in claim 18 in which said source emits a p polarized light beam.

20. A device for use with an optical information recording medium which has one or more tracks positionally related to information storage locations at the medium which are capable of modulating light in accordance with information stored thereat, comprising:

a first optical system which includes a light source emitting light;

a second optical system which receives light from said first optical system and causes at least a portion thereof to impinge on said medium and to be converted thereby to a modulated beam to thereby read information from or write information in or on the medium;

wherein said second optical system is movable relative to the first optical system in the course of said reading or writing of information; and wherein said second, movable optical system includes a tracking error detector which is movable therewith relative to the first optical system and receives at least a portion of said modulated light and in response thereto generates a signal related to tracking errors related to said reading or writing of information.

* * * * *